United States Patent Office 2,981,434
Patented Apr. 25, 1961

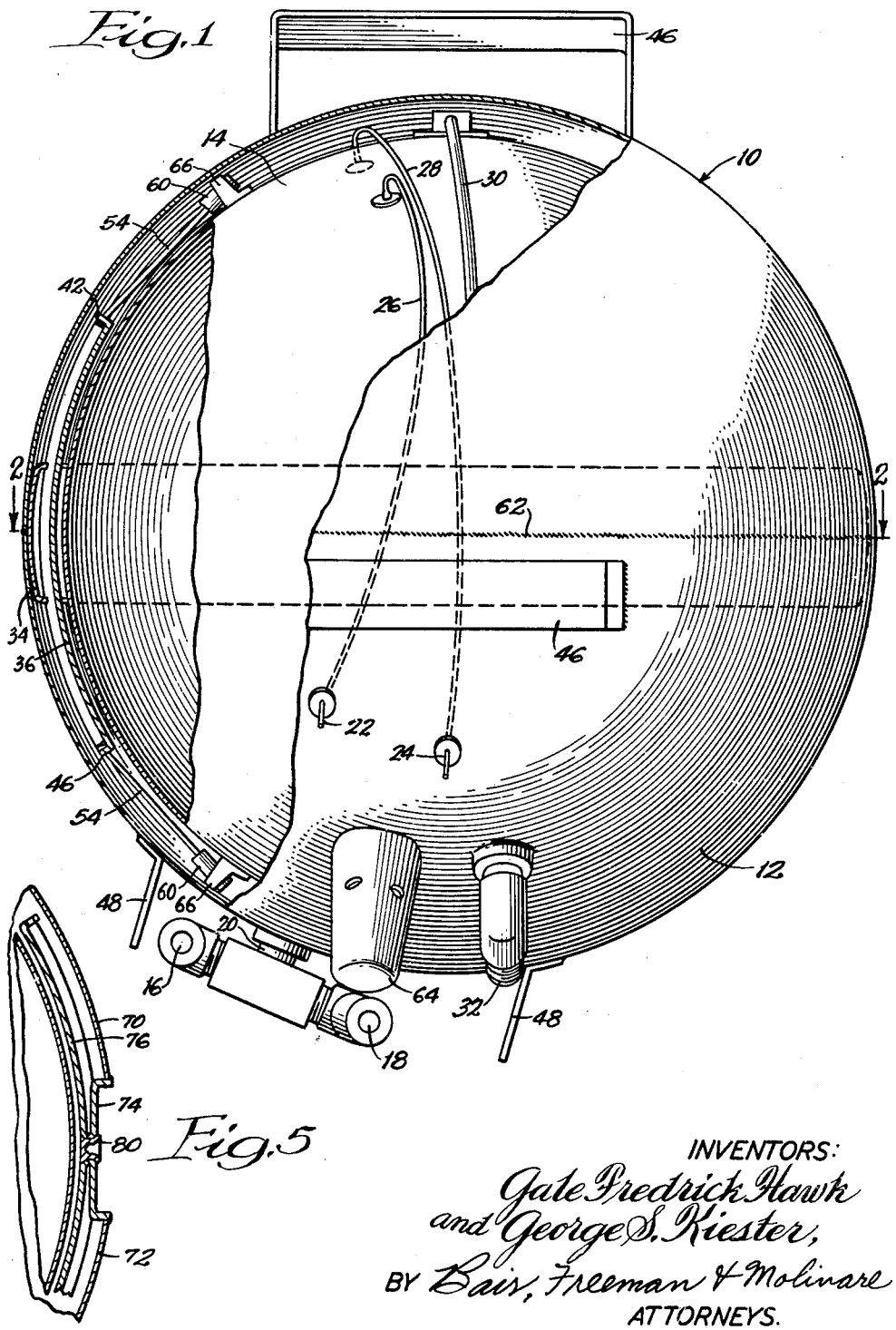

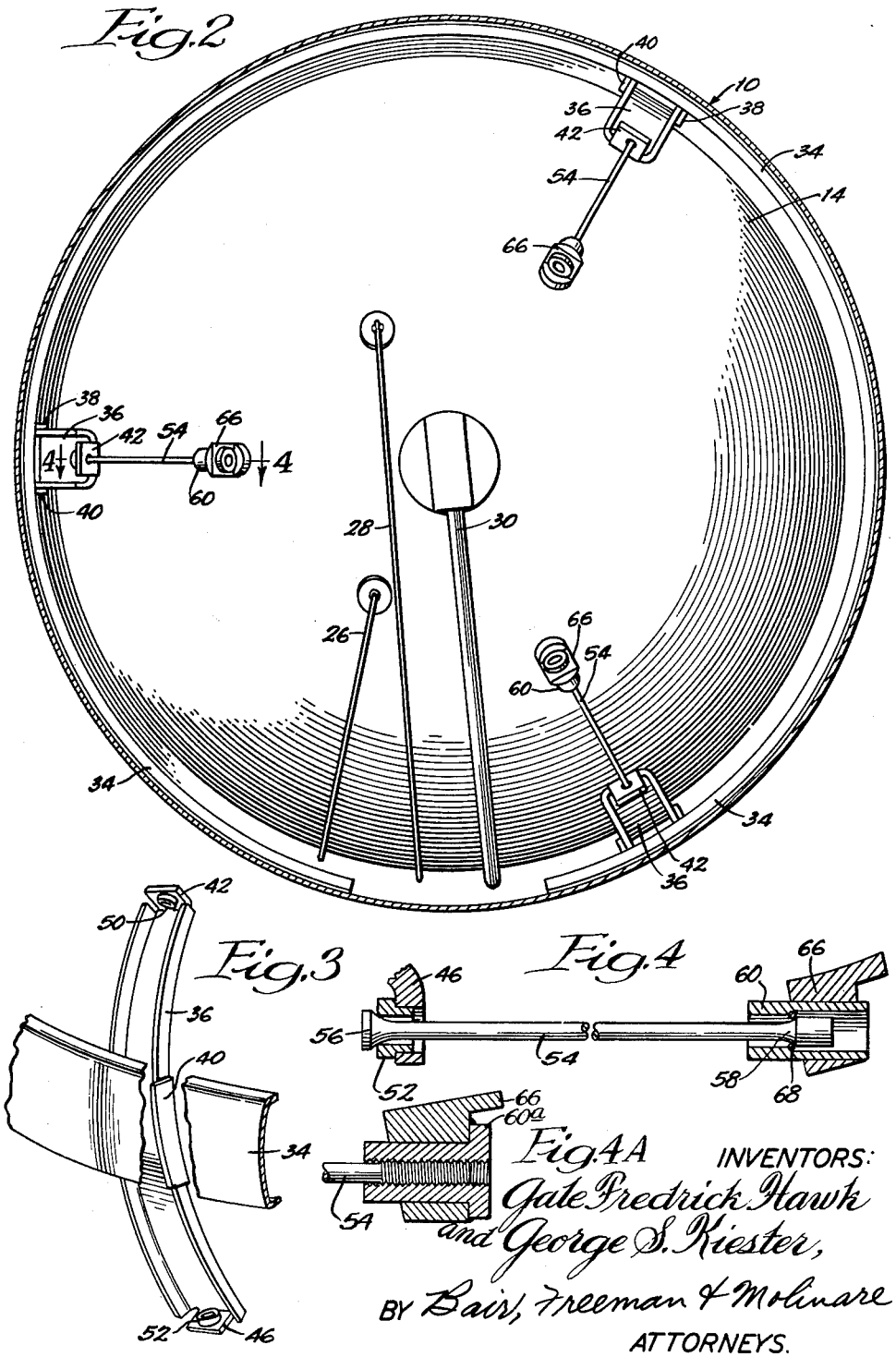

2,981,434

SUSPENSION SYSTEM LIQUID OXYGEN CONVERTER

Gale Frederick Hawk and George S. Kiester, Bryan, Ohio, assignors to The Aro Equipment Corporation, a corporation of Ohio Original application Aug. 17, 1956, Ser. No. 604,744. Divided and this application Oct. 19, 1959, Ser. No. 847,338

5 Claims. (Cl. 220—15)

This invention relates generally to improvements in container suspension systems and more particularly to improvements in suspension systems for thermally insulated containers of the type adapted to store liquid oxygen and the like. This application is a division of our co-pending application Serial No. 604,744, filed August 17, 1956, and now Patent No. 2,924,351.

The requirements for containers of the type adapted to hold and store low temperature materials are relatively stringent. For example, in containers for converter systems utilizing liquid oxygen—such as may be found in apparatus used as a source of breathing oxygen in aircraft designed for high altitude flight—resistance to heat loss should be as high as is practically obtainable. Further, the containers should be relatively sturdy with high resistance to vibration, shock and other mechanical disturbances. Still further, such containers advantageously should be relatively light weight, compact, efficient, capable of holding a vacuum and economical to manufacture and use. Liquid oxygen containers of the prior art have not proved entirely satisfactory in meeting these requirements, and consequently there has existed a need for a new type of liquid oxygen container.

It is a general object of this invention to provide an improved container and, in particular, an improved container for holding and storing liquid oxygen and the like.

It is another object of this invention to provide an improved vacuum container which has high resistance to heat loss and therefore is capable of storing liquid oxygen for substantial periods of time without undue vaporization.

It is still another object of this invention to provide an improved liquid oxygen container which is characterized by its efficiency, light weight and high resistance to injury from vibration, shock and similar mechanical disturbances.

It is a further object of this invention to provide such an improved liquid oxygen container, as above, having an inner shell for storing liquid oxygen suspended within an outer shell, the space between the two shells being evacuated to a high degree, and the outer shell being formed of two spherical segments and an equatorial central band adapted to support a plurality of uniformly spaced arcuate suspension beams therearound for minimizing the mechanical contact between the inner and outer shells.

These and other objects are realized in accordance with the features embodied in specific illustrative embodiments of this invention in which an inner shell suitable for use with liquid oxygen and the like is suspended within an outer shell with a practical minimum of mechanical contact therebetween, and with the space between the two shells capable of being evacuated to a relatively high degree. Advantageously, the inner shell is in the form of a sphere to provide minimum surface area for a given volume. Manifestly this results in providing minimum force on the internal surface of the inner shell for a given gas pressure therewithin. The outer or protective shell advantageously is also in the form of a sphere, but is of larger radius than the container such that the inner shell is completely enclosed by the outer shell. The inner and outer shells, hereinafter referred to as the inner and outer spheres, respectively, are maintained spaced from each other by means of a novel beam suspension system which minimizes mechanical contact, and hence heat transfer, between the two spheres.

In accordance with the preferred embodiment of the invention defined herein, the outer shell comprises two spherical segments, each less than a hemisphere and each welded to opposite circumferential edges of a band constituting the central zone of the outer sphere. Three arcuate suspension beams are secured at equally spaced points to the band extending laterally of the inner and outer sphere. One pair of spokes is associated with each arcuate suspension beam and is adapted to be fastened to fittings on the surface of the inner sphere for maintaining the latter in dimensional balance at six points within the outer sphere.

The above and other features of novelty which characterize the invention are pointed out with particularity in the claims annexed to and forming a part of this specification. For a better understanding of this invention, however, its advantages and specific objects attained with its use, reference is had to the accompanying drawing and descriptive matter in which is shown and described several illustrative embodiments of the invention.

In the drawing:

Figure 1 is a side elevation partially broken away of one embodiment of a liquid oxygen container embodying the suspension system of the present invention;

Figure 2 is a top plan view of the inner sphere of the container of Figure 1, taken substantially on line 2—2 thereof;

Figure 3 is a perspective view with the band partially broken away showing the arcuate suspension beam in accordance with the invention;

Figure 4 is a view taken substantially on line 4—4 of Figure 2 showing the spoke and fitting construction;

Figure 4A shows an alternative construction for the spoke and fitting; and

Figure 5 is a partial cross section illustrating the construction of another embodiment of the invention.

Referring now to the drawing, the specific illustrative embodiment shown in Figures 1 through 4A thereof comprises a thermally insulated container 10 having an outer sphere 12 and an inner sphere 14. Inner sphere 14 is of smaller radial dimension than outer sphere 12 and is adapted to be supported within the outer sphere with a minimum of physical contact therebetween.

Inner sphere 14 is suitable for holding and storing low temperature materials such as liquid oxygen which may be supplied to the inner sphere through an inlet conduit 16 and removed from the inner sphere through an outlet conduit 18. In the particular embodiment of the invention shown in Figure 1 conduits 16 and 18 are connected in parallel to a single pipe 20 extending through outer shell 12 and into inner shell 14. Conduit 16 advantageously may be connected to a filler valve and conduit 18 may be connected to a liquid check valve, such as are included in oxygen supply systems.

The liquid contents of inner sphere 14 may be indicated by a suitable gauge connected to electrical terminals 22 and 24 extending through outer shell 12 and connected by conductors 26 and 28, respectively, to a probe within the inner shell. A conduit 32 is provided on outer shell 12 and is connected by piping 30 to the upper portion of inner shell 14. This permits desired pressures to be built up inside inner shell 14 to enable the container to function properly with suitable oxygen using equipment such as oxygen masks and the like with which the container is utilized.

It will be appreciated that since liquid oxygen vaporizes at a temperature of −183° C., it is necessary that a maximum degree of thermal insulation be maintained between the inner and outer spheres. This is attained in accordance with the invention by means of a novel suspension system comprising three arcuate suspension beams 36 fixed at 120 degree spacings to a band 34 welded to the inner circumference of outer sphere 12. Band 34 extends substantially around the inner circumference of the outer sphere with only a relatively small gap between its ends. As seen most clearly in Figures 1 and 3, band 34 is of channel cross section and is positioned with its flanges facing inwardly towards the inner sphere. It is a feature of this invention that the longitudinal curvature of band 34 is greater than the longitudinal curvature of sphere 12 such that when the band 34 is welded to the inner surface of the outer sphere 12, the weld defines substantially single line contact between band 34 and sphere 12. This is clearly shown, for example, in Figure 1 wherein the single line contact between band 34 and sphere 12 is provided along the weld line 62.

Three arcuate suspension beams 36 are attached at equally spaced points to band 34. Each suspension beam 36 is of channel cross section and is welded by means of lugs 38 and 40 on opposite flanges thereof to band 34. Alternatively, each suspension beam 36 may be formed with extension flanges extending outwardly from the beam in lieu of lugs 38 and 40. In this embodiment, the beam extension flanges would be welded to band 34 to secure the beam thereto. The center of curvature of each suspension beam 36 is approximately the same as the centers of curvature of the inner and outer shells so that when the suspension beam is welded at right angles to band 34, the suspension beam is positioned intermediate and in parallel noncontacting relation with the inner and outer shells.

Each suspension beam 36 has at one end thereof an apertured flange 42 and at the other end thereof an apertured flange 46. A collar 50 extends outwardly from the inner face of flange 42 and a collar 52 extends outwardly from the inner face of flange 46. An elongated spoke 54 having a flared neck 56 at one end thereof is positioned through collar 50 and apertured flange 46 such that the collar engages the flared neck to provide a stop for the spoke.

In the embodiment of the invention shown in Figure 4, the other end of spoke 54 also is formed with a flared neck 58. The spoke is dimensionally balanced by drawing tube 60 into a fitting 66 which advantageously is welded to the outer surface of inner sphere 14. This creates a tension on spoke 54 by virtue of the action of O-ring 68 in tubing 60 on spoke neck 58. After balance is made tubing 60 is welded to fitting 66.

Alternatively, as shown in the embodiment of Figure 4A, tubular member 60a is provided with an interior thread and the other end of spoke 54 is externally threaded to enable the spoke to be adjusted as desired. After the necessary adjustment has been made, the enlarged end of tubular member 60a, abutting fitting 66 is welded to the fitting to fix the spoke firmly in position.

Fitting 66 advantageously is welded to the outer surface of inner sphere 14 in both embodiments. It can now be seen that inner sphere 14 is supported by spokes 54 positioned in tension at six points on its outer surface—three points are spaced 120° apart on one half of inner sphere 14 and three points are spaced 120° apart on the other half of sphere 14. When the desired dimensional balance has been obtained each spoke is fixed in position by swaging collar 52 on flared neck 56 of the spoke to draw the spoke tight in assembly. After the suspension adjustment, collar 52 is welded to fitting 46 to provide additional rigidity to the inner sphere suspension.

When the above-described operation is completed, the two hemispheres comprising outer sphere 12 are welded together as designated at 62 in Figure 1. The space between the inner and outer spheres then is evacuated to provide additional thermal insulation for inner sphere 14 through a pinch off, shown covered by cap 64.

The preferred embodiment of the invention defined in this divisional application is shown in Figure 5. As clearly disclosed therein, the outer sphere may comprise the spherical segments 70 and 72, each smaller than a hemisphere. A band 74 of channel cross section forms the central zone of the outer sphere. Advantageously, band 74 is placed with its flanges facing outwardly, that is, away from the inner sphere and the circumferential edges of spherical segments 70 and 72 are welded to the ends of the flanges of band 74 such that the ends of the band are flush with the spherical segments.

It will be appreciated that the construction illustrated in Figure 5 gives rise to several important advantages. Thus, the center band 74, being of channel cross section, provides a means for mounting the container by the use of straps and the like, in lieu of welded brackets, such as mounting brackets 48 shown in the embodiment of Figure 1. This serves to enhance the structural efficiency of the container since every time a bracket is welded thereto, the chances of introducing leakage due to a faulty weld or induced stresses are increased.

Additionally, the use of the three piece outer sphere construction of Figure 5 permits the use of the center band 74 as the structural member for the support of the inner sphere. This allows the shell thickness of the two spherical segments 70 and 72 to be minimized as these segments need not be constructed as structural members. The resultant savings in weight and cost inherent in the construction of Figure 5 thus are evident.

A plurality of arcuate suspension beams 76, similar in construction to previously described arcuate suspension beams 36, are connected to band 74. Advantageously, three suspension beams 76 are affixed to band 74 at equally spaced points on the inner face of the band. Each suspension beam 76 is secured to band 74 by means of a stud 80 extending through suspension beam 76 and band 74 in tight clamping relation thereto. As in the embodiment of Figures 1 through 4, a pair of apertured flanges is provided at the ends of each suspension beam 76 for connection to spokes in the manner described above.

One alternative construction, in which stud 80 is eliminated, comprises forming suspension beam 76 with extended flanges which are adapted to be mated and welded to central band 74. Another alternative construction in accordance with the invention comprises the forming of suspension beams 76 as integral parts of central band 74. Thus in this embodiment, the beams and band are integrally formed, such as in a one piece stamping which is fashioned into a circle and finally welded with the beams at right angles to the spherical segments of the outer sphere.

It will be understood by those skilled in the art that band 74 may be welded to spherical segments 70 and 72 with its flanges facing inwardly toward the inner sphere. This is an alternative embodiment which has been found to provide highly advantageous results.

To facilitate the welding operations, it is contemplated that the inner and outer spheres may be formed of stainless steel as the latter material is impervious to the diffusion of gases therethrough. It further is contemplated that to enhance the thermal insulation characteristics of the novel container, the outer surface of inner sphere and the inner surface of outer sphere will each be plated as with copper, gold and the like, to increase their reflection qualities.

It will be understood by those skilled in the art that modifications may be made in the construction and arrangement of the parts of the above-described suspension system liquid oxygen converter without departing from the real purpose and spirit of the invention and that it is intended to cover by the appended claims any modified forms of structures, circuits or use of equivalents which reasonably may be included within their scope.

What is claimed is:

1. A thermally insulated container for storing liquid oxygen and the like comprising an inner sphere of given radial dimension, an outer sphere of greater radial dimension completely enclosing said inner sphere, said outer sphere comprising a pair of spherical segments each smaller than a hemisphere and a circular band, the opposite circumferential edges of which are affixed to the edges of said pair of spherical segments, a plurality of laterally extending arcuate suspension beams secured to the inner face of said circular band at evenly spaced apart points therearound, said arcuate suspension beams being positioned parallel to the surfaces of said inner and outer spheres, a pair of fittings for each arcuate suspension beam secured to the outer surface of said inner sphere, a fitting of each pair being spaced from and in alignment with one end of its associated arcuate suspension beam, a spoke disposed between each fitting and an end of an arcuate suspension beam and means for adjusting and maintaining said spokes in tension between the arcuate suspension beam and the fitting to maintain the inner sphere in dimensional balance within said outer sphere.

2. A thermally insulated container comprising an inner sphere of given radial dimension, an outer sphere of greater radial dimension completely enclosing said inner sphere, said outer sphere comprising a pair of spherical segments each smaller than a hemisphere and a circular band of channel cross section having flanges affixed to the edges of said pair of spherical segments, three transversely extending arcuate suspension beams uniformly spaced around said circular band and positioned intermediate and parallel to the surfaces of said inner and outer spheres, a fitting secured to said inner sphere in spaced alignment with each end of said three arcuate suspension beams and a spoke between each fitting and an end of each arcuate suspension beam for maintaining said inner sphere in dimensional balance within said outer sphere.

3. A thermally insulated container assembly comprising an inner container of generally spherical configuration having a first radial dimension, an outer container of generally spherical configuration having a second radial dimension greater than said first radial dimension and completely enclosing said inner container, said outer container comprising a pair of spherical segments each smaller than a hemisphere and a circular central band having a pair of spaced apart circumferential edges extending therearound and affixed respectively to the circumferential edges of said pair of spherical segments, and means connected to said central band for maintaining said inner container in dimensional balance within said outer container, said means comprising a plurality of arcuate extension beams uniformly spaced around said central band and extending transversely thereto, each of said extension beams being adapted to receive inner container supporting means at the opposite ends thereof.

4. A thermally insulated container assembly in accordance with claim 3 wherein said circular central band is formed with channel cross-section, and said arcuate extension beams are directly secured to said circular central band, to enhance the structural efficiency of the container.

5. A thermally insulated container assembly in accordance with claim 3 wherein said pair of spherical segments are formed with a shell thickness smaller than the shell thickness of said circular central band, whereby only said central band serves as a structural member to support said inner container.

References Cited in the file of this patent

UNITED STATES PATENTS

| | | |
|---|---|---|
| 2,467,428 | Hansen et al. | Apr. 19, 1949 |
| 2,577,171 | Wiggins | Dec. 4, 1951 |
| 2,814,410 | Hansen | Nov. 26, 1957 |